(12) United States Patent
Terui et al.

(10) Patent No.: US 11,429,108 B2
(45) Date of Patent: Aug. 30, 2022

(54) NOISE-CANCELLING LEARNING DEVICE AND VEHICLE PROVIDED WITH SAME

(71) Applicant: Hitachi Automotive Systems, Ltd., Hitachinaka (JP)

(72) Inventors: Koichi Terui, Hitachinaka (JP); Makoto Kudo, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 99 days.

(21) Appl. No.: 16/969,708

(22) PCT Filed: Jan. 29, 2019

(86) PCT No.: PCT/JP2019/002849
§ 371 (c)(1),
(2) Date: Aug. 13, 2020

(87) PCT Pub. No.: WO2019/167519
PCT Pub. Date: Sep. 6, 2019

(65) Prior Publication Data
US 2021/0004018 A1 Jan. 7, 2021

(30) Foreign Application Priority Data
Feb. 27, 2018 (JP) .............................. JP2018-033312

(51) Int. Cl.
*G05D 1/02* (2020.01)
*G08G 1/16* (2006.01)

(52) U.S. Cl.
CPC ......... *G05D 1/0221* (2013.01); *G05D 1/0214* (2013.01); *G08G 1/16* (2013.01); *G05D 1/0246* (2013.01); *G05D 1/0257* (2013.01)

(58) Field of Classification Search
CPC .. G05D 1/0221; G05D 1/0214; G05D 1/0246; G05D 1/0257; G08G 1/16;
(Continued)

(56) References Cited

U.S. PATENT DOCUMENTS

2017/0076608 A1 3/2017 Suzuki
2017/0109644 A1* 4/2017 Nariyambut Murali ..................... G06N 7/005
2019/0286907 A1* 9/2019 Wu .................. G06V 20/58

FOREIGN PATENT DOCUMENTS

JP 2005-275723 A 10/2005
JP 2007-323117 A 12/2007
(Continued)

OTHER PUBLICATIONS

International Search Report with English translation and Written Opinion issued in corresponding application No. PCT/JP2019/002849 dated May 7, 2019.

*Primary Examiner* — Rodney A Butler
(74) *Attorney, Agent, or Firm* — Foley & Lardner LLP (57) ABSTRACT

Provided is a noise-canceling learning device capable of performing control so as to prevent performing processing such as useless deceleration at the same place in self driving, for example, on a highway, and a vehicle including the noise-canceling learning device. The detection determination processing unit 143 of the noise-canceling learning device 14 causes the perceived object to be stored in (a data table of) the information storage unit 144 as a determination object in association with the perceived object and the own vehicle position information, determines whether the perceived object perceived by the sensor recognition perceiving unit 141 and the determination object stored in (a data table of) the information storage unit 144 match based on the position of the own vehicle 1 estimated by the own vehicle position estimating unit 142, and determines whether the perceived object perceived by the sensor recognition perceiving unit 141 is correct.

7 Claims, 11 Drawing Sheets

(58) Field of Classification Search
CPC .. G08G 1/0129; G08G 1/09623; G08G 1/165; G01S 7/412; G01S 13/931
See application file for complete search history.

(56) References Cited

FOREIGN PATENT DOCUMENTS

WO    WO-2015/190050 A1    12/2015
WO    WO-2016/121688 A1    8/2016

* cited by examiner

| No. | DISTANCE | POSITION INFORMATION | RECOGNITION PATTERN | PERCEIVED OBJECT | TRACKING | DETERMINATION OBJECT |
|---|---|---|---|---|---|---|
| 1 | 200m | $x_1° / y_1°$ | $Pt_1$ | VEHICLE | — | ROAD SURFACE SCRATCH |
| 2 | 175m | $x_2° / y_2°$ | $Pt_2$ | VEHICLE | 1 | ROAD SURFACE SCRATCH |
| 3 | 150m | $x_3° / y_3°$ | $Pt_3$ | VEHICLE | 2 | ROAD SURFACE SCRATCH |
| 4 | 125m | $x_4° / y_4°$ | $Pt_4$ | ROAD SURFACE SCRATCH | 3 | ROAD SURFACE SCRATCH |
| 5 | 100m | $x_5° / y_5°$ | $Pt_5$ | ROAD SURFACE SCRATCH | 4 | ROAD SURFACE SCRATCH |
| 6 | 75m | $x_6° / y_6°$ | $Pt_6$ | ROAD SURFACE SCRATCH | 5 | ROAD SURFACE SCRATCH |
| 7 | 50m | $x_7° / y_7°$ | $Pt_7$ | ROAD SURFACE SCRATCH | 6 | ROAD SURFACE SCRATCH |
| 8 | 25m | $x_8° / y_8°$ | $Pt_8$ | ROAD SURFACE SCRATCH | 7 | ROAD SURFACE SCRATCH |
| 9 | 0m | $x_9° / y_9°$ | $Pt_9$ | ROAD SURFACE SCRATCH | 8 | ROAD SURFACE SCRATCH |

FIG. 4

| No. | DISTANCE | POSITION INFORMATION | TIME | RECOGNITION PATTERN | PERCEIVED OBJECT | TRACKING | DETERMINATION OBJECT |
|---|---|---|---|---|---|---|---|
| 1 | 200m | $x_1°/y_1°$ | $h_1:m_1:s_1$ | $Pt_1$ | VEHICLE | — | ROAD SURFACE SCRATCH |
| 2 | 175m | $x_2°/y_2°$ | $h_2:m_2:s_2$ | $Pt_2$ | VEHICLE | 1 | ROAD SURFACE SCRATCH |
| 3 | 150m | $x_3°/y_3°$ | $h_3:m_3:s_3$ | $Pt_3$ | VEHICLE | 2 | ROAD SURFACE SCRATCH |
| 4 | 125m | $x_4°/y_4°$ | $h_4:m_4:s_4$ | $Pt_4$ | ROAD SURFACE SCRATCH | 3 | ROAD SURFACE SCRATCH |
| 5 | 100m | $x_5°/y_5°$ | $h_5:m_5:s_5$ | $Pt_5$ | ROAD SURFACE SCRATCH | 4 | ROAD SURFACE SCRATCH |
| 6 | 75m | $x_6°/y_6°$ | $h_6:m_6:s_6$ | $Pt_6$ | ROAD SURFACE SCRATCH | 5 | ROAD SURFACE SCRATCH |
| 7 | 50m | $x_7°/y_7°$ | $h_7:m_7:s_7$ | $Pt_7$ | ROAD SURFACE SCRATCH | 6 | ROAD SURFACE SCRATCH |
| 8 | 25m | $x_8°/y_8°$ | $h_8:m_8:s_8$ | $Pt_8$ | ROAD SURFACE SCRATCH | 7 | ROAD SURFACE SCRATCH |
| 9 | 0m | $x_9°/y_9°$ | $h_9:m_9:s_9$ | $Pt_9$ | ROAD SURFACE SCRATCH | 8 | ROAD SURFACE SCRATCH |

FIG. 5

| No. | DISTANCE | POSITION INFORMATION | TIME | WEATHER | RECOGNITION PATTERN | PERCEIVED OBJECT | TRACKING | DETERMINATION OBJECT |
|---|---|---|---|---|---|---|---|---|
| 1 | 200m | $x_1°/y_1°$ | $h_1:m_1:s_1$ | SUNNY | $Pt_1$ | VEHICLE | — | ROAD SURFACE SCRATCH |
| 2 | 175m | $x_2°/y_2°$ | $h_2:m_2:s_2$ | SUNNY | $Pt_2$ | VEHICLE | 1 | ROAD SURFACE SCRATCH |
| 3 | 150m | $x_3°/y_3°$ | $h_3:m_3:s_3$ | SUNNY | $Pt_3$ | VEHICLE | 2 | ROAD SURFACE SCRATCH |
| 4 | 125m | $x_4°/y_4°$ | $h_4:m_4:s_4$ | SUNNY | $Pt_4$ | ROAD SURFACE SCRATCH | 3 | ROAD SURFACE SCRATCH |
| 5 | 100m | $x_5°/y_5°$ | $h_5:m_5:s_5$ | SUNNY | $Pt_5$ | ROAD SURFACE SCRATCH | 4 | ROAD SURFACE SCRATCH |
| 6 | 75m | $x_6°/y_6°$ | $h_6:m_6:s_6$ | SUNNY | $Pt_6$ | ROAD SURFACE SCRATCH | 5 | ROAD SURFACE SCRATCH |
| 7 | 50m | $x_7°/y_7°$ | $h_7:m_7:s_7$ | SUNNY | $Pt_7$ | ROAD SURFACE SCRATCH | 6 | ROAD SURFACE SCRATCH |
| 8 | 25m | $x_8°/y_8°$ | $h_8:m_8:s_8$ | SUNNY | $Pt_8$ | ROAD SURFACE SCRATCH | 7 | ROAD SURFACE SCRATCH |
| 9 | 0m | $x_9°/y_9°$ | $h_9:m_9:s_9$ | SUNNY | $Pt_9$ | ROAD SURFACE SCRATCH | 8 | ROAD SURFACE SCRATCH |

FIG. 6

| No. | DISTANCE | POSITION INFORMATION | RECOGNITION PATTERN | PERCEIVED OBJECT | TRACKING | ERRONEOUS DETECTION FLAG |
|---|---|---|---|---|---|---|
| 1 | 200m | $x_1°/y_1°$ | $Pt_1$ | VEHICLE | — | 1 |
| 2 | 175m | $x_2°/y_2°$ | $Pt_2$ | VEHICLE | 1 | 1 |
| 3 | 150m | $x_3°/y_3°$ | $Pt_3$ | VEHICLE | 2 | 1 |
| 4 | 125m | $x_4°/y_4°$ | $Pt_4$ | ROAD SURFACE SCRATCH | 3 | 0 |
| 5 | 100m | $x_5°/y_5°$ | $Pt_5$ | ROAD SURFACE SCRATCH | 4 | 0 |
| 6 | 75m | $x_6°/y_6°$ | $Pt_6$ | ROAD SURFACE SCRATCH | 5 | 0 |
| 7 | 50m | $x_7°/y_7°$ | $Pt_7$ | ROAD SURFACE SCRATCH | 6 | 0 |
| 8 | 25m | $x_8°/y_8°$ | $Pt_8$ | ROAD SURFACE SCRATCH | 7 | 0 |
| 9 | 0m | $x_9°/y_9°$ | $Pt_9$ | ROAD SURFACE SCRATCH | 8 | 0 |

FIG. 7

| No. | DISTANCE | POSITION INFORMATION | RECOGNITION PATTERN | PERCEIVED OBJECT | TRACKING | DETERMINATION OBJECT |
|---|---|---|---|---|---|---|
| 1 | 200m | / | | | | |
| 2 | 175m | / | | | | |
| 3 | 150m | / | | | | |
| 4 | 125m | / | | | | |
| 5 | 100m | $x_5°/y_5°$ | $Pt_5$ | ANIMAL | — | ANIMAL |
| 6 | 75m | / | | | | |
| 7 | 50m | / | | | | |
| 8 | 25m | / | | | | |
| 9 | 0m | / | | | | |

FIG. 8

| No. | DISTANCE | POSITION INFORMATION | RECOGNITION PATTERN | PERCEIVED OBJECT | TRACKING | DETERMINATION OBJECT |
|---|---|---|---|---|---|---|
| 1 | 200m | $x_1°/y_1°$ | $Pt_1$ | VEHICLE | — | ROAD SURFACE SCRATCH |
| 2 | 175m | $x_2°/y_2°$ | $Pt_2$ | VEHICLE | 1 | ROAD SURFACE SCRATCH |
| 3 | 150m | $x_3°/y_3°$ | $Pt_3$ | VEHICLE | 2 | ROAD SURFACE SCRATCH |
| 4 | 125m | $x_4°/y_4°$ | $Pt_4$ | ROAD SURFACE SCRATCH | 3 | ROAD SURFACE SCRATCH |
| 5 | 100m | / | — | — | 4 | ROAD SURFACE SCRATCH |
| 6 | 75m | $x_6°/y_6°$ | $Pt_6$ | ROAD SURFACE SCRATCH | 5 | ROAD SURFACE SCRATCH |
| 7 | 50m | $x_7°/y_7°$ | $Pt_7$ | ROAD SURFACE SCRATCH | 6 | ROAD SURFACE SCRATCH |
| 8 | 25m | $x_8°/y_8°$ | $Pt_8$ | ROAD SURFACE SCRATCH | 7 | ROAD SURFACE SCRATCH |
| 9 | 0m | $x_9°/y_9°$ | $Pt_9$ | ROAD SURFACE SCRATCH | 8 | ROAD SURFACE SCRATCH |

NOISE-CANCELLING LEARNING DEVICE AND VEHICLE PROVIDED WITH SAME

TECHNICAL FIELD

The present invention relates to a noise-canceling learning device and a vehicle including the noise-canceling learning device, and more particularly, to a noise-canceling learning device capable of performing control so as to prevent performing processing such as useless deceleration at the same place, and a vehicle including the noise-canceling learning device.

BACKGROUND ART

For example, in self driving on a highway, it is necessary to detect an on-road fallen object 200 m away.

Figure 10:
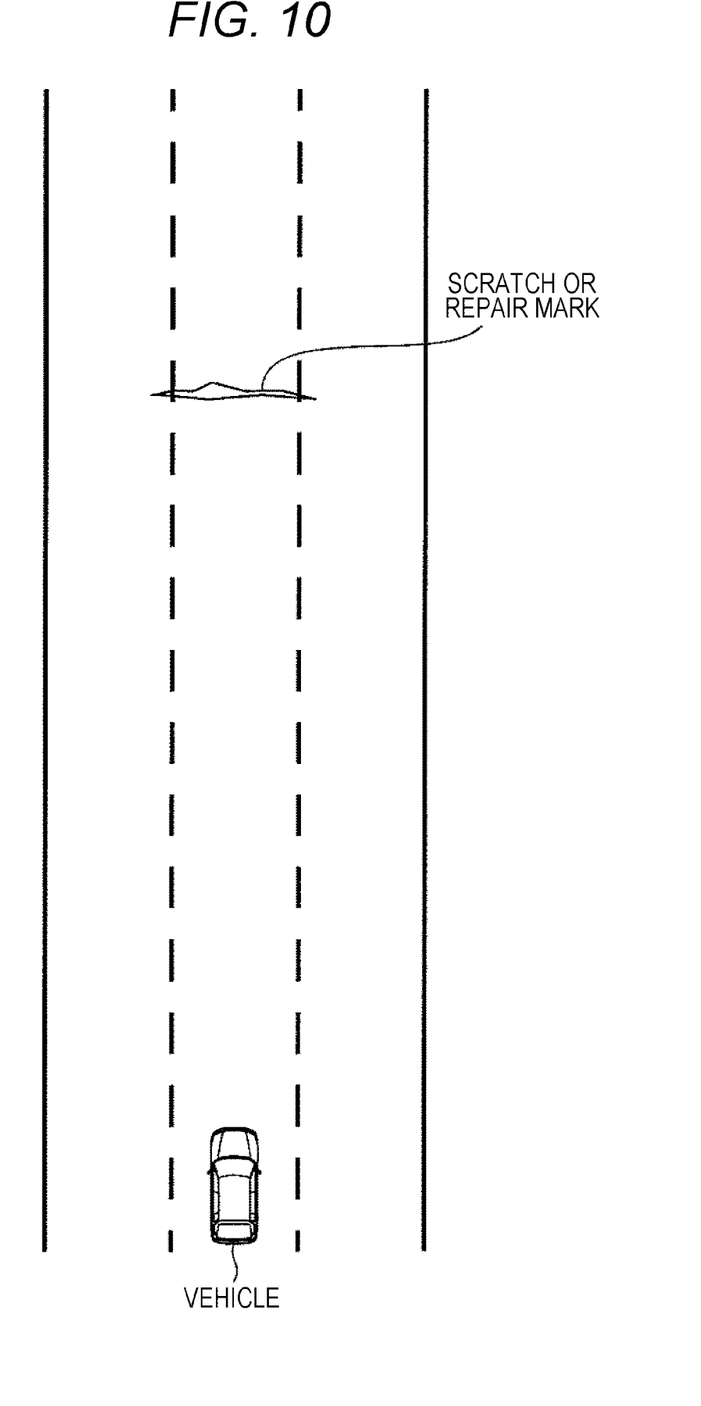
FIG. 10 is an example of a scratch or a repair mark on the road surface.

In the case of recognition by an on board camera, detecting an on-road fallen object 200 m away is likely to erroneously recognize a scratch or a repair mark on the road surface as shown in FIG. 10, and the removal of such noise is a problem.

Figure 11:
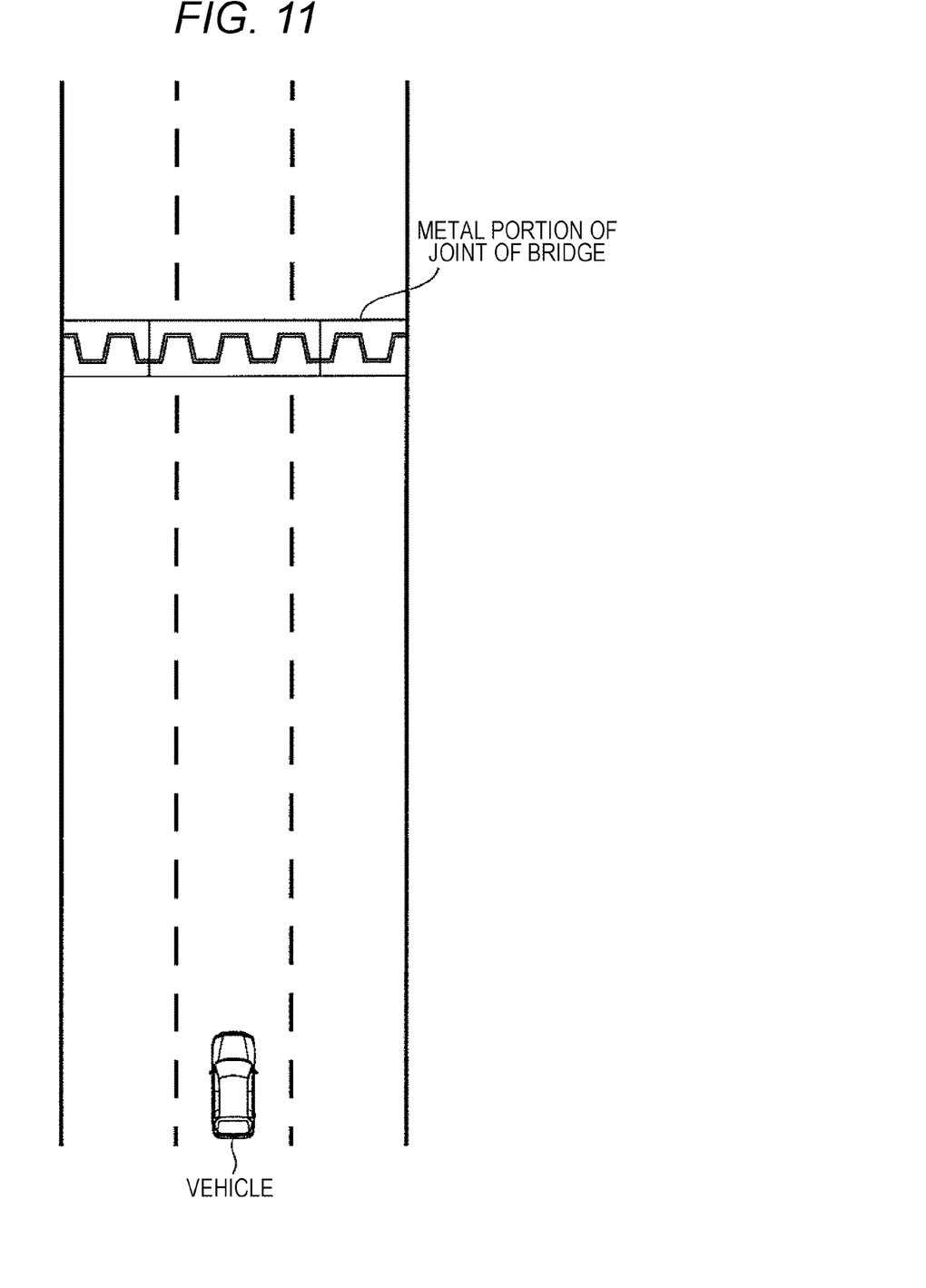
FIG. 11 is an example of a metal portion of a joint of a bridge.

On the other hand, also when a millimeter wave radar is used, since the radio wave reflection intensity differs depending on the material, for example, the metal portion of a joint of a bridge as shown in FIG. 11 may be erroneously recognized as a protrusion.

At driving automation level 3 or higher, since the driving authority is on the vehicle side, when a suspicious object is detected, it is necessary to perform deceleration and avoidance for safety, so that there is a problem that high-speed traveling is difficult even on a highway in a place where there are many objects and road surface patterns that can be noise.

As an example of a system for detecting information on the above-described on-road obstacle, for example, PTL 1 discloses a road communication system capable of safely and quickly notifying other vehicles of information on an obstacle present on the road, a mobile entity device, and an information processing method for the mobile entity device.

For example, the road communication system described in PTL 1 includes: a mobile entity device mounted on the vehicle; a roadside device located on or near a road; and a central management device for managing the roadside device. The mobile entity device includes: an imaging means for capturing an image including the road; an analyzing means for analyzing an image captured by the imaging means and for detecting an object on the road; a determining means for determining whether the object detected by the analyzing means is an obstacle; and a storage means for storing information on the obstacle when the determining means determines that the object is an obstacle. The roadside device includes: an acquiring means for acquiring information on an obstacle stored in the storage means of the mobile entity device; and a transmitting means for transmitting information on the obstacle acquired by the acquiring means to the central management device. The central management unit includes: a receiving means for receiving information on the obstacle transmitted by the transmitting means of the roadside device; and a presenting means for presenting information on the obstacle received by the receiving means or information related thereto.

CITATION LIST

Patent Literature

PTL 1: JP 2007-323117 A

SUMMARY OF INVENTION

Technical Problem

In the conventional technology described in PTL 1, since information captured by sensors is shared through a central management device, it is possible to share information (the situation) more quickly than updating information manually, but only the true information on currently existing objects is shared. Therefore, as described above, when a scratch, a repair mark, or the like on the road surface is erroneously perceived as a control target object such as an on-road fallen object, the information is shared as true information, and when the same place is traveled next time, processing such as useless deceleration may occur.

The present invention has been made in view of the circumstances described above, and an object of the present invention is to provide a noise-canceling learning device capable of performing control so as to prevent performing processing such as useless deceleration at the same place in self driving, for example, on a highway, and a vehicle including the noise-canceling learning device.

Solution to Problem

In order to solve the above problem, a noise-canceling learning device according to the present invention includes: an own vehicle position estimating unit configured to estimate a position of an own vehicle; a sensor recognition perceiving unit configured to perceive a target object existing around the own vehicle as a perceived target object; a detection determination processing unit configured to determine whether the perceived target object perceived by the sensor recognition perceiving unit is correct; and an information storage unit for storing a position of the own vehicle estimated by the own vehicle position estimating unit. The detection determination processing unit causes the information storage unit to store the perceived target object as a determination target object in association with positions of the perceived target object and the own vehicle, determines whether the perceived target object perceived by the sensor recognition perceiving unit and the determination target object stored in the information storage unit match based on a position of the own vehicle estimated by the own vehicle position estimating unit, and determines whether the perceived target object perceived by the sensor recognition perceiving unit is correct.

In addition, a vehicle according to the present invention includes: the noise-canceling learning device; a map distribution unit configured to distribute map information; a position information receiving device configured to receive position information; a sensor mounted on the own vehicle, the sensor configured to recognize surroundings of the own vehicle; and a vehicle control device configured to control a traveling state of the own vehicle based on vehicle control information generated by the noise-canceling learning device.

Advantageous Effects of Invention

According to the present invention, the detection determination processing unit of the noise-canceling learning device causes the information storage unit to store the perceived target object as a determination target object in association with positions of the perceived target object and the own vehicle, determines whether the perceived target object perceived by the sensor recognition perceiving unit and the determination target object stored in the information storage unit match based on the position of the own vehicle estimated by the own vehicle position estimating unit, and determines whether the perceived target object perceived by the sensor recognition perceiving unit is correct. That is, the target object erroneously perceived as a control target object such as an on-road fallen object (a scratch, a repair mark, or the like on the road surface) is stored in the vehicle together with its position information, and when the same place is traveled next time, traveling control can be performed using the stored information, so that the vehicle can be controlled so as not to perform processing of useless deceleration and the like at the same place next time.

Problems, configurations, and effects other than those described above will be clarified by the following description of embodiments.

DESCRIPTION OF EMBODIMENTS

Hereinafter, embodiments of the present invention will be described with reference to the drawings.

First Embodiment

Figure 1:
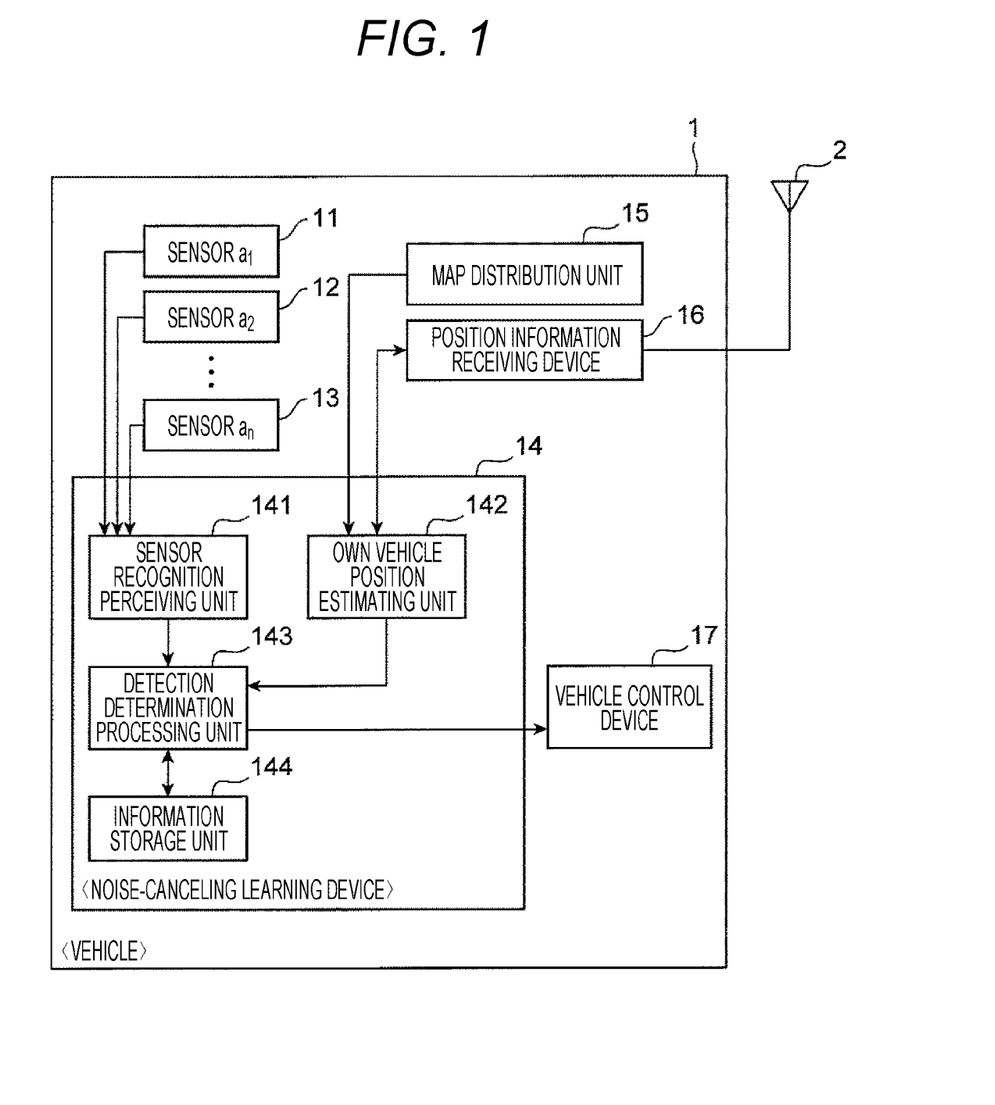
FIG. 1 is a schematic configuration diagram of a vehicle mounting a first embodiment of a noise-canceling learning device according to the present invention.

FIG. 1 is a schematic configuration diagram of a vehicle mounting a first embodiment of a noise-canceling learning device according to the present invention.

The vehicle 1 of the illustrated embodiment mounts a sensor $a_1$ 11, a sensor $a_2$ 12, a sensor $a_n$ 13, a noise-canceling learning device 14, a map distribution unit 15, a position information receiving device 16, a vehicle control device 17, and a GPS antenna 2. The noise-canceling learning device 14 includes a sensor recognition perceiving unit 141, an own vehicle position estimating unit 142, a detection determination processing unit 143, and an information storage unit 144.

The sensor $a_1$ 11, the sensor $a_2$ 12, and the sensor $a_n$ 13 include, for example, a camera, a radar, or the like capable of detecting 200 m or more ahead of the vehicle (own vehicle) 1. The sensor $a_1$ 11, the sensor $a_2$ 12, and the sensor $a_n$ 13 recognize the surroundings of the vehicle 1, and transmit the recognition results to the sensor recognition perceiving unit 141 of the noise-canceling learning device 14 at a predetermined period.

From the results of recognition by the respective sensors $a_1$ 11, sensor $a_2$ 12, and sensor $a_n$ 13, the sensor recognition perceiving unit 141 perceives an object as a target object existing around the own vehicle 1 (pedestrian, bicycle, motorcycle, vehicle, or the like), and the distance to the object (hereinafter, the perceived object and distance to the object may be collectively referred to as object information or perceived information). More specifically, the sensor recognition perceiving unit 141 checks the recognition results recognized by the respective sensor $a_1$ 11, sensor $a_2$ 12, and sensor $a_n$ 13 against a recognition pattern, perceives an object (target object) that matches the recognition pattern as a perceived object (perceived target object), and perceives the distance to the perceived object (perceived target object).

On the other hand, the map distribution unit 15 is for distributing map information, and the position information receiving device 16 is for receiving position information on GPS and the like.

The own vehicle position estimating unit 142 of the noise-canceling learning device 14 estimates an own vehicle position from the map information stored in the map distribution unit 15 and the position information on the vehicle 1 received at a predetermined period by the position information receiving device 16 through the GPS antenna 2.

The detection determination processing unit 143 of the noise-canceling learning device 14 reads the data table (detailed below) stored in the information storage unit 144 of the noise-canceling learning device 14, and determines whether information matching the own vehicle position information estimated by the own vehicle position estimating unit 142 is stored. If there is no matching information (data), the detection determination processing unit 143 generates vehicle control information to be used for traveling control of the own vehicle 1 based on the object information perceived by the sensor recognition perceiving unit 141, and outputs the vehicle control information to the vehicle control device 17.

Thereafter, the detection determination processing unit 143 stores the own vehicle position information estimated by the own vehicle position estimating unit 142, and the object (perceived object), the distance to the object, and the like, perceived by the sensor recognition perceiving unit 141 in (a data table of) the information storage unit 144.

On the other hand, if there is matching information (data), the detection determination processing unit 143 compares the distance to the object, and the recognition pattern at that time, stored in the data table read from the information storage unit 144 with the distance to the object, and the recognition pattern of the object, perceived by the sensor recognition perceiving unit 141. If the comparison results do not match, based on the object information perceived by the sensor recognition perceiving unit 141, vehicle control information to be used for traveling control of the own vehicle 1 is generated and output to the vehicle control device 17. Thereafter, the detection determination processing unit 143 stores the own vehicle position information estimated by the own vehicle position estimating unit 142, and the object (perceived object), the distance to the object, and the like, perceived by the sensor recognition perceiving unit 141 in (a data table of) the information storage unit 144. In addition, if the comparison results match, based on the determination object (detailed below) stored in the data table, vehicle control information to be used for traveling control of the own vehicle 1 is generated, and the vehicle control information is output to the vehicle control device 17. Thereafter, the detection determination processing unit 143 stores the own vehicle position information estimated by the own vehicle position estimating unit 142, and the object (perceived object), the distance to the object, and the like, perceived by the sensor recognition perceiving unit 141 in (a data table of) the information storage unit 144.

When it is necessary to avoid the perceived and detected object (for example, when the object is a pedestrian, bicycle, motorcycle, vehicle, on-road fallen object, or the like), the vehicle control information described above is output to the vehicle control device 17 as steering, accelerator, and brake control information for achieving a trajectory that avoids objects including lane changes, and when it is possible to travel without avoiding the perceived and detected object (for example, when the object is a scratch or repair mark on the road surface, a metal portion of a bridge joint, or the like), the vehicle control information described above is output to the vehicle control device 17 as information for controlling the steering, accelerator, and brake for maintaining the previous control.

Based on the vehicle control information transmitted from the detection determination processing unit 143 of the noise-canceling learning device 14, the vehicle control device 17 controls the steering, accelerator, brake, and the like of the vehicle 1 to (automatically) control the traveling state (deceleration, avoidance, or the like) of the vehicle 1.

Next, creation and update of the data table stored in the information storage unit 144 by the detection determination processing unit 143 will be described with reference to FIGS. 2 and 3. It should be noted that the following operation is performed at a predetermined period.

Figure 2:
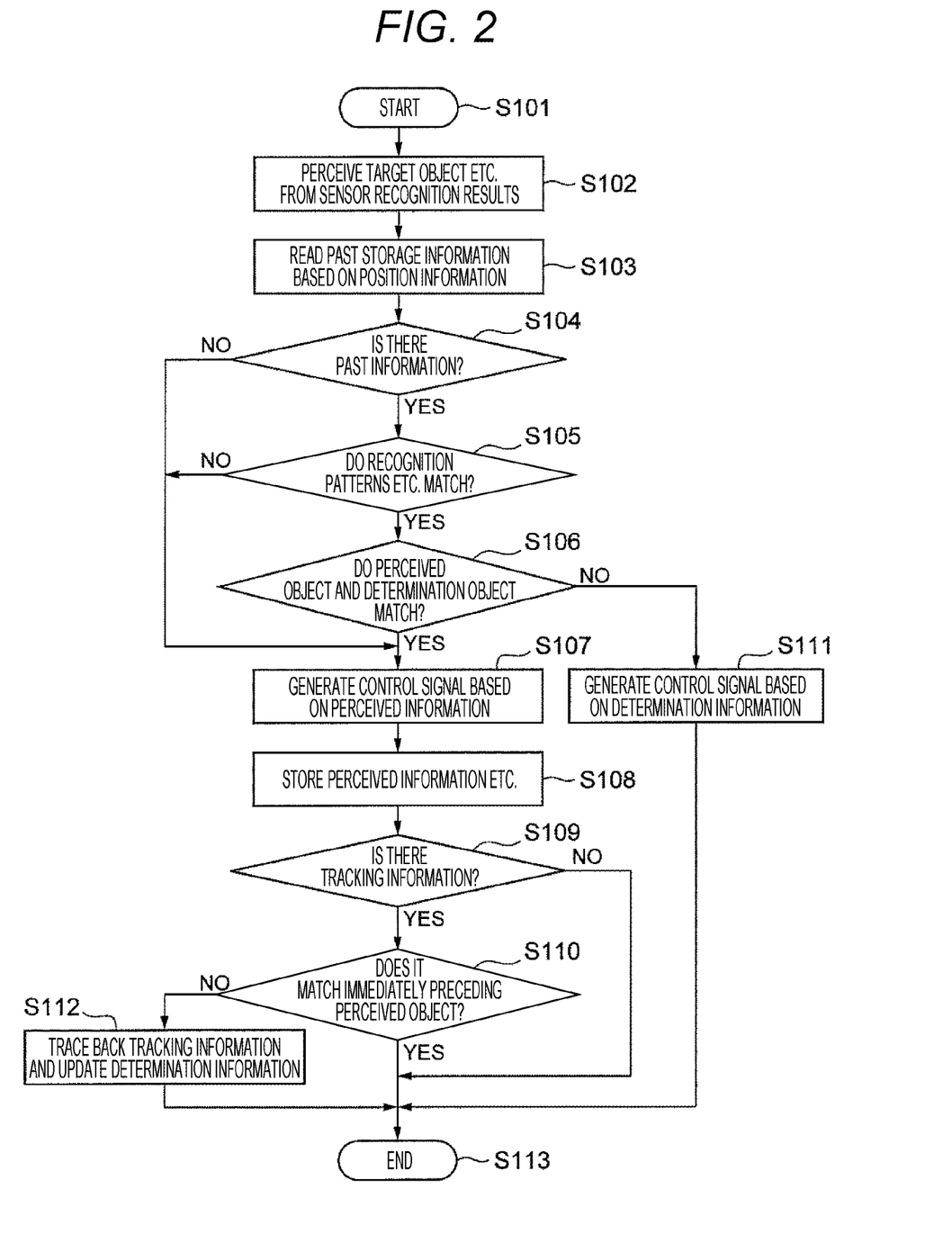
FIG. 2 is an operation flow diagram of the noise-canceling learning device shown in FIG. 1.

As shown in FIG. 2, in step S101, the noise-canceling learning device 14 starts operation.

In step S102, the sensor recognition perceiving unit 141 perceives an object (pedestrian, bicycle, motorcycle, vehicle, or the like) as a target object existing around the own vehicle 1 and the distance to the object from the results recognized by the respective sensors $a_1$ 11, $a_2$ 12, and $a_n$ 13 (sensor recognition results).

Figure 3:
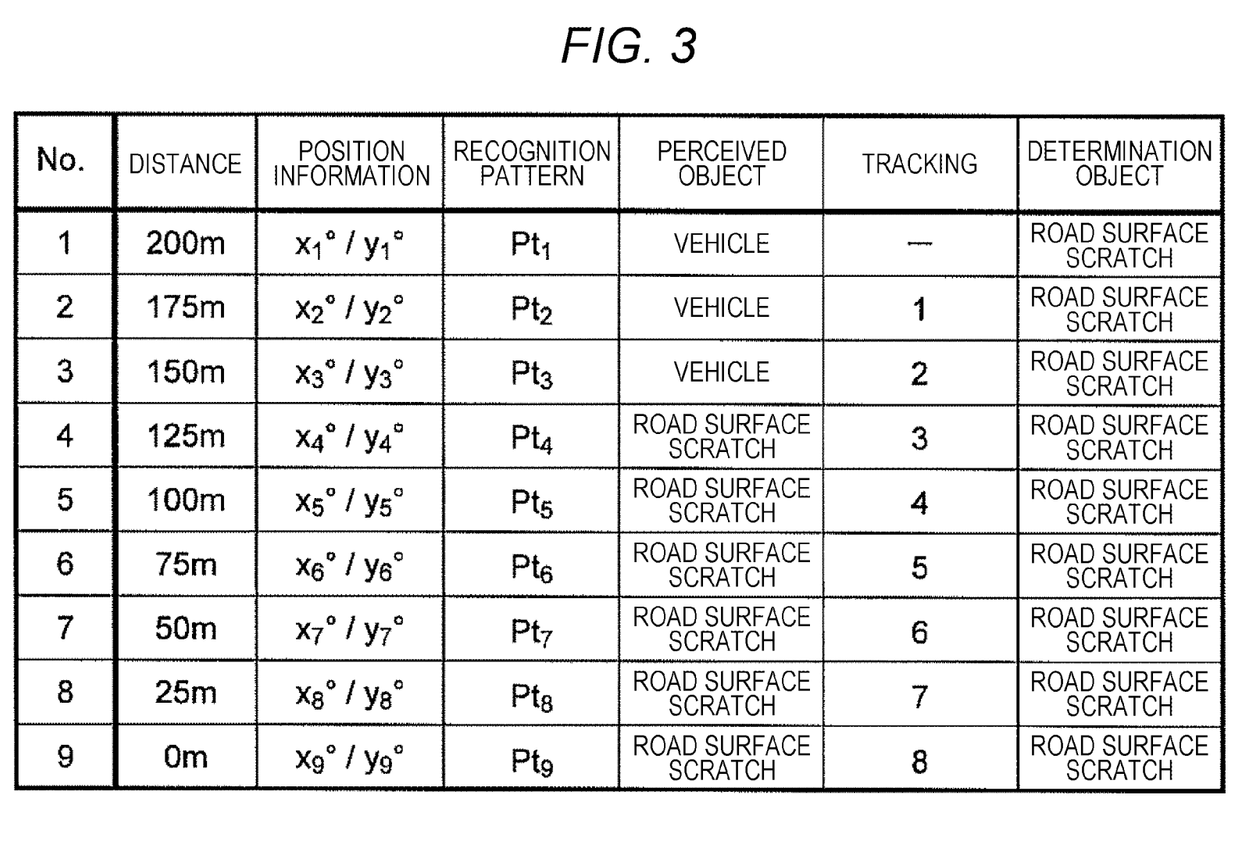
FIG. 3 is a diagram showing an example of a data table stored in an information storage unit of the noise-canceling learning device.

In step S103, the detection determination processing unit 143 reads the data table (in other words, past storage information) illustrated in FIG. 3 stored in the information storage unit 144.

In step S104, the detection determination processing unit 143 compares the own vehicle position information estimated by the own vehicle position estimating unit 142 with the position information indicating the latitude and longitude in the data table shown in FIG. 3. If the own vehicle position information and the position information in the data table match (in other words, if there is past information), the process proceeds to step S105, and if they do not match, the process proceeds to step S107.

In step S105, the recognition pattern and the distance to the object in the position information matched in step S104 in the data table described in FIG. 3, and the recognition pattern of the object perceived by the sensor recognition perceiving unit 141 and the distance to the object are compared. If the recognition patterns and the distances to the objects match, the process proceeds to step S106, and if they do not match, the process proceeds to step S107.

In step S106, the detection determination processing unit 143 compares the perceived object perceived by the sensor recognition perceiving unit 141 with the determination object (detailed below) in the data table illustrated in FIG. 3. If the perceived object and the determination target object match, the process proceeds to step S107, and if they do not match, the process proceeds to step S111.

In step S107, the detection determination processing unit 143 generates vehicle control information (that is, a control signal) based on the object information (perceived information) perceived by the sensor recognition perceiving unit 141, and outputs the vehicle control information to the vehicle control device 17.

In addition, in step S108, the detection determination processing unit 143 stores the own vehicle position information estimated by the own vehicle position estimating unit 142, the object perceived by the sensor recognition perceiving unit 141 (perceived object), the recognition pattern of the object at that time, and the distance to the object (these may be collectively referred to as perceived information by the sensor recognition perceiving unit 141) in (a data table of) the information storage unit 144. In addition, those similar to the perceived objects are stored in another area of the data table as determination objects (particularly, see No. 4 or after in FIG. 3). That is, the detection determination processing unit 143 stores the perceived object in another area of the data table as a determination object in association with (linked with) the own vehicle position information estimated by the own vehicle position estimating unit 142, the object (perceived object) perceived by the sensor recognition perceiving unit 141, and the like. It should be noted that after perceiving the object, the detection determination processing unit 143 tracks the object, and stores the information in (a data table of) the information storage unit 144 as tracking information so that it can be traced from which information of the table information the information has moved, together with (associated with) the own vehicle position information, the perceived object, the determination object, and the like.

In step S109, the detection determination processing unit 143 refers to the tracking information in the data table illustrated in FIG. 3 (in other words, determines whether there is tracking information in the perceived object). If there is tracking information in the perceived object, the process proceeds to step S110, and if there is no tracking information in the perceived object, the process proceeds to step S113, and the processing ends.

In step S110, the detection determination processing unit 143 compares the perceived object in the immediately preceding tracking information on the tracking information in the data table illustrated in FIG. 3 with the perceived object perceived by the sensor recognition perceiving unit 141. If the comparison results match, the process proceeds to step S113, and the processing ends. On the other hand, if they do not match, the process proceeds to step S112.

In step S112, the detection determination processing unit 143 traces back the tracking information in the data table illustrated in FIG. 3 and updates the information (determination information) on the determination object in the data table of the information storage unit 144 with the information (perceived information) on the perceived object perceived by the sensor recognition perceiving unit 141 (particularly, see No. 3 or before in FIG. 3), and then the process proceeds to step S113 to end the processing.

In step S106, if the perceived object and the determination object do not match, in step S111, the detection determination processing unit 143 generates vehicle control information (that is, control signals) based on the determination object (determination information) in the data table illustrated in FIG. 3, and outputs the vehicle control information to the vehicle control device 17, and then the process proceeds to step S113 to end the processing.

Thus, in the present embodiment, the detection determination processing unit 143 of the noise-canceling learning device 14 causes the perceived object to be stored in (a data table of) the information storage unit 144 as a determination object in association with the perceived object and the own vehicle position information, determines whether the perceived object perceived by the sensor recognition perceiving unit 141 and the determination object stored in (a data table of) the information storage unit 144 match based on the position of the own vehicle 1 estimated by the own vehicle position estimating unit 142, and determines whether the perceived object perceived by the sensor recognition perceiving unit 141 is correct. That is, a target object (a scratch, a repair mark, or the like on the road surface) erroneously perceived as a control target object such as an on-road fallen object is stored in (a data table of) the information storage unit 144 of the vehicle 1 together with its position information. More specifically, the own vehicle position information obtained by perceiving the erroneously perceived object, the distance to the object, and the like are stored in (a data table of) the information storage unit 144 and correct perceived information is stored in another area of the data table as determination information, and when the same place is traveled next time, traveling control can be performed using the stored information, so that the vehicle 1 can be controlled so as not to perform processing of useless deceleration and the like at the same place next time.

In addition, in the present embodiment, the perceived information and the determination information are both stored. However, storing only the determination information makes it possible to achieve reduction in the memory capacity.

<Another Example of Data Table (Part 1)>

Next, another configuration of the data table stored in the information storage unit 144 will be described with reference to FIGS. 2, 3, and 4.

Figure 4:
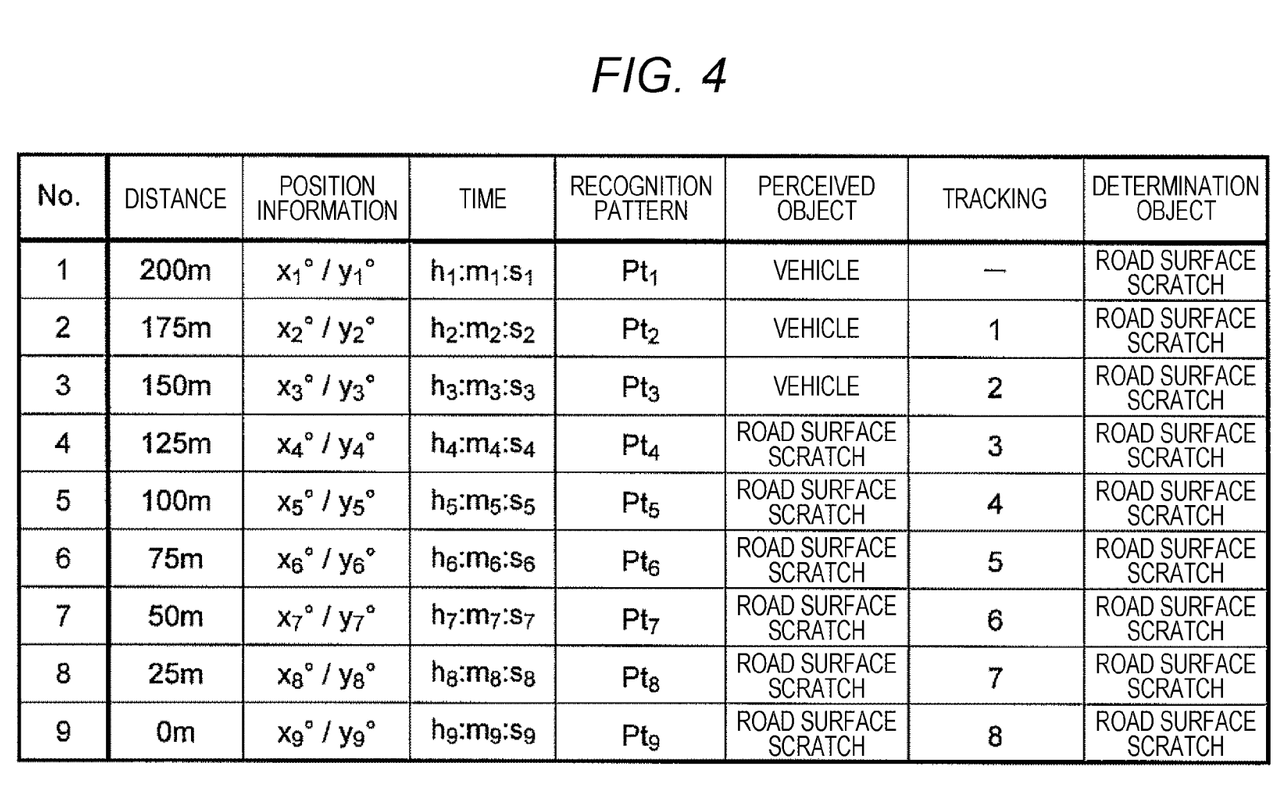
FIG. 4 is a diagram showing another example of a data table stored in the information storage unit of the noise-canceling learning device.

In FIG. 4, in addition to the data table illustrated in FIG. 3, in step S108 in FIG. 2, the detection determination processing unit 143 stores the own vehicle position information estimated by the own vehicle position estimating unit 142, the object perceived by the sensor recognition perceiving unit 141, the recognition pattern of the object at that time, the distance to the object, and the time at which the object is perceived in (a data table of) the information storage unit 144.

Thus, for example, it is possible to achieve noise-canceling processing when erroneous perception does not occur at normal times but erroneous perception occurs due to the influence of sunlight at sunrise, sunset, or the like. (During the day or during the night, no erroneous perception occurs even at the same place)

<Another Example of Data Table (Part 2)>

Next, another configuration of the data table stored in the information storage unit 144 will be described with reference to FIGS. 2, 4, and 5.

Figure 5:
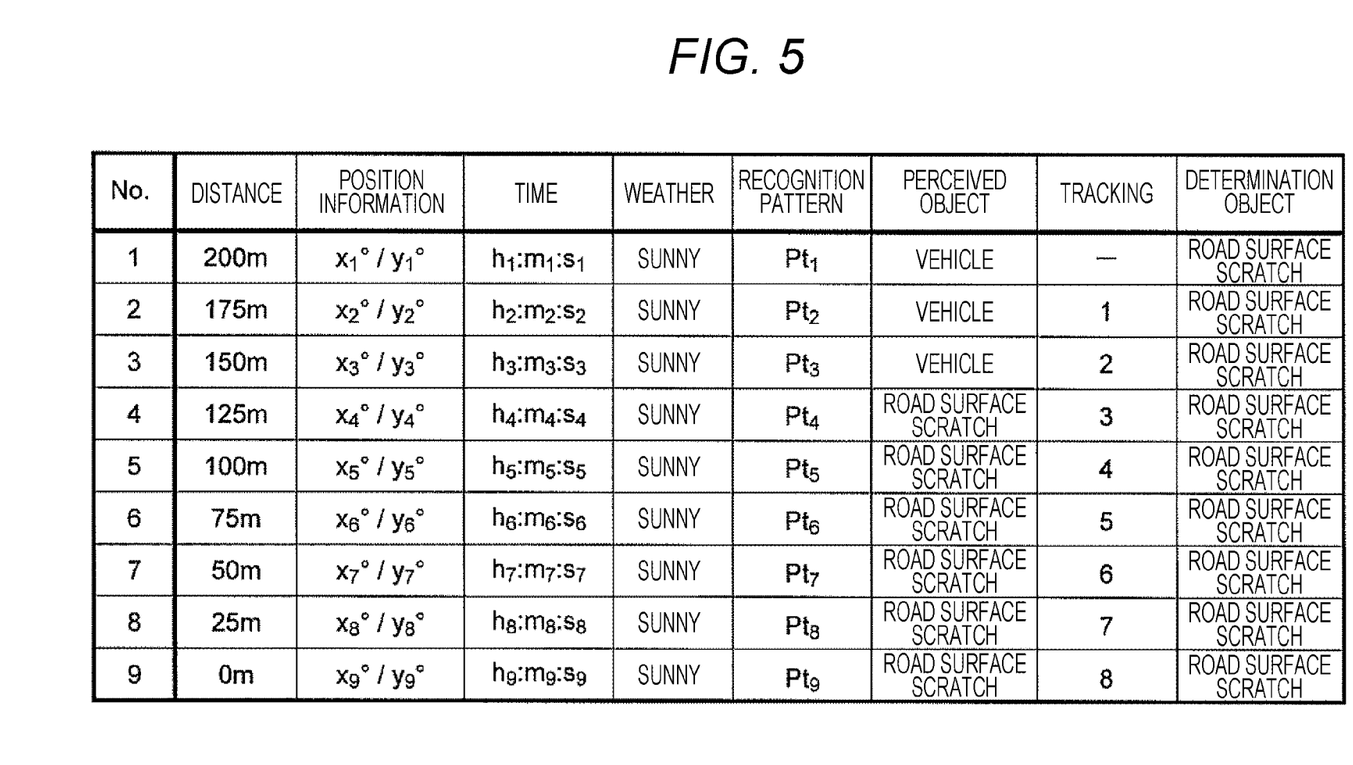
FIG. 5 is a diagram showing another example of a data table stored in the information storage unit of the noise-canceling learning device.

In FIG. 5, in addition to the data table illustrated in FIG. 4, in step S108 in FIG. 2, the detection determination processing unit 143 stores the own vehicle position information estimated by the own vehicle position estimating unit 142, the object perceived by the sensor recognition perceiving unit 141, the recognition pattern of the object at that time, the distance to the object, the time at which the object is perceived, and the weather in (a data table of) the information storage unit 144.

Thus, for example, it is possible to achieve noise-canceling processing when erroneous perception occurs due to the influence of sunlight during the daytime on a sunny day. (On cloudy and rainy days, no erroneous perception occurs even at the same time)

It should be noted that in FIG. 5, the time and the weather are stored, but it is needless to say that only the weather may be stored.

<Another Example of Data Table (Part 3)>

Next, another configuration of the data table stored in the information storage unit 144 will be described with reference to FIGS. 2 and 6.

Figure 6:
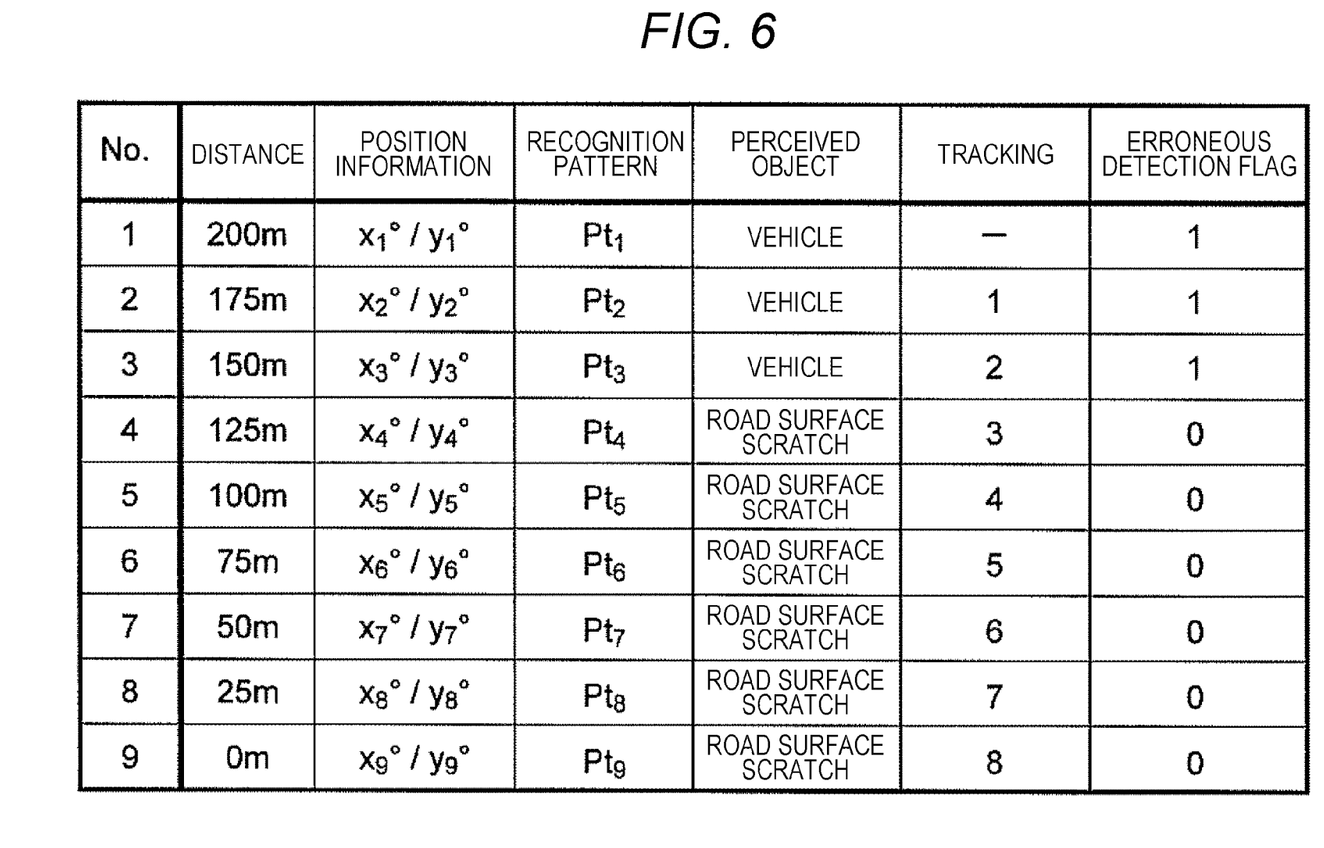
FIG. 6 is a diagram showing another example of a data table stored in the information storage unit of the noise-canceling learning device.

In FIG. 6, in step S110 in FIG. 2, the detection determination processing unit 143 compares the perceived object in the immediately preceding tracking information on the tracking information in the data table illustrated in FIG. 6 with the perceived object perceived by the sensor recognition perceiving unit 141. If the comparison results match, the erroneous detection flag "0" is set (in particular, see No. 4 or after in FIG. 6), and then the process proceeds to step S113 to end the processing. On the other hand, if the comparison results do not match, the process proceeds to step S112.

In step S112 in FIG. 2, the detection determination processing unit 143 traces back the tracking information in the data table illustrated in FIG. 6, and updates the preset erroneous detection flag to "1" (in particular, see No. 3 or before in FIG. 6), and then the process proceeds to step S113 to end the processing.

Thus, it is possible to achieve reduction in the memory capacity, and to perform processing such as not controlling the vehicle 1 where the erroneous detection flag is set.

<Another Example of Data Table (Part 4)>

Next, another configuration of the data table stored in the information storage unit 144 will be described with reference to FIG. 7.

Figure 7:
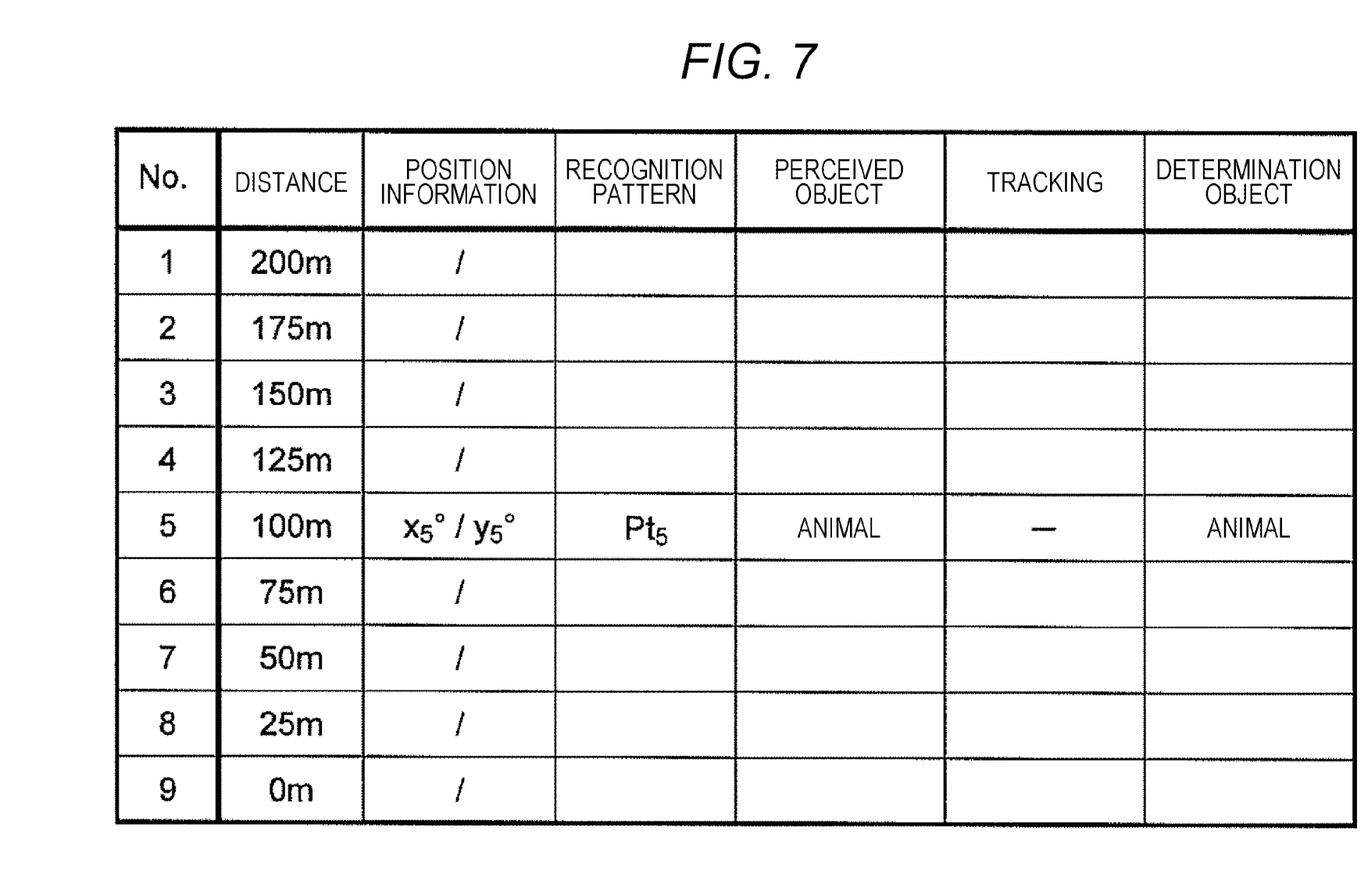
FIG. 7 is a diagram showing another example of a data table stored in the information storage unit of the noise-canceling learning device.

FIG. 7 shows an example in which an object is perceived only at a certain moment. For example, when an animal crosses a highway, the animal can be seen only at that moment (that is, the animal is perceived by the sensor) but cannot be seen after that, so that control is not performed as erroneous perception, and control can be performed on the vehicle 1 as instantaneous (crossing) erroneous detection information also when the vehicle travels next time.

<Another Example of Data Table (Part 5)>

Next, another configuration of the data table stored in the information storage unit 144 will be described with reference to FIG. 8.

Figure 8:
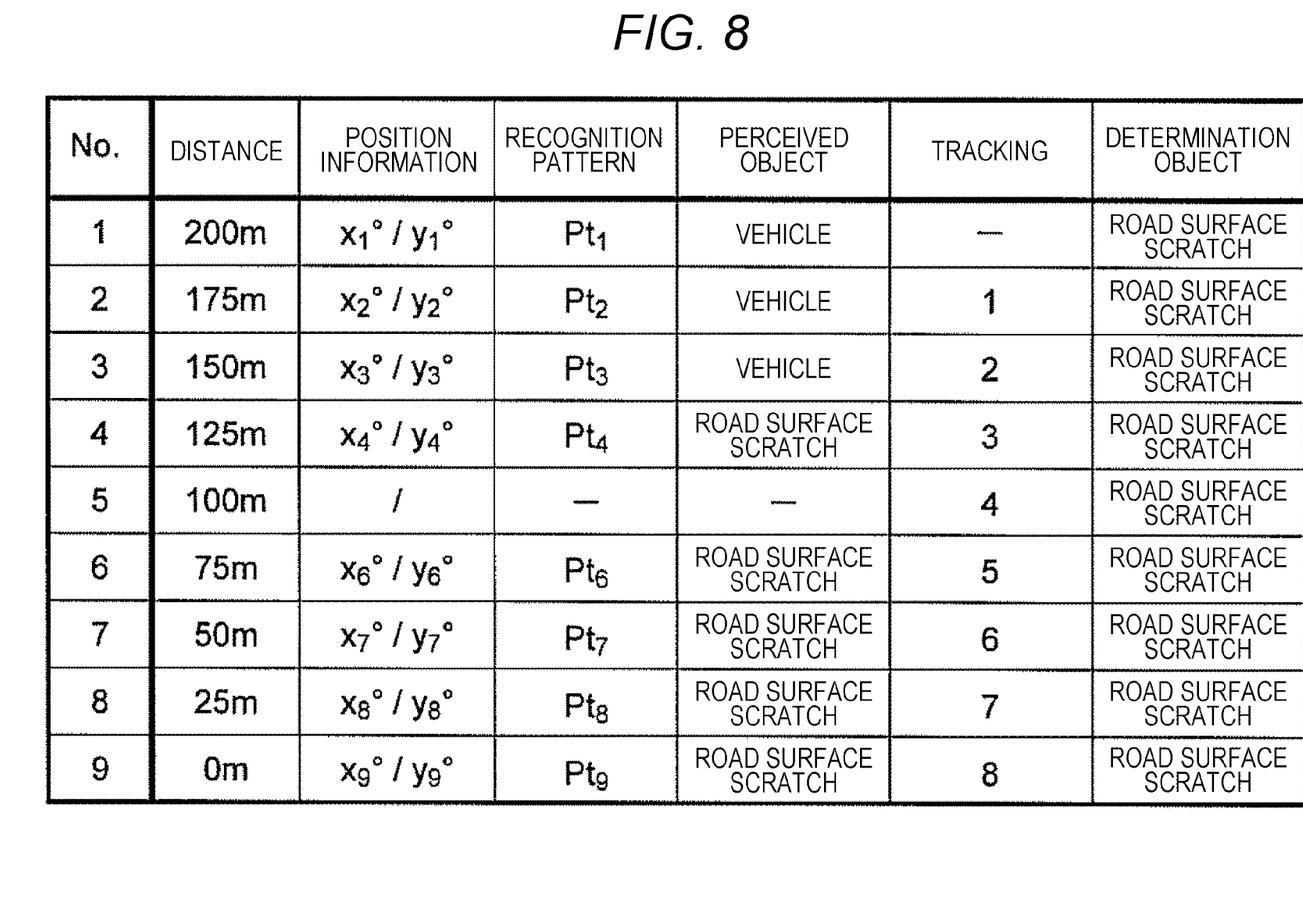
FIG. 8 is a diagram showing another example of a data table stored in the information storage unit of the noise-canceling learning device.

In contrast to FIG. 7 above, FIG. 8 shows an example in which an object is not perceived only at a certain moment. This is an example in which an object is instantaneously unperceived due to the influence of surrounding features or the like. In this case, the tracking information is continued (particularly, see No. 5 in FIG. 8), and the object is treated as the same object.

Thus, it is possible to continue processing even on instantaneous non-perception. However, if the non-perception period continues for a certain predetermined period, it is determined that the object has really disappeared (equivalent to erroneous perception determination such as crossing) and corresponding control is performed.

Second Embodiment

Next, another embodiment of the present invention will be described with reference to FIG. 9.

Figure 9:
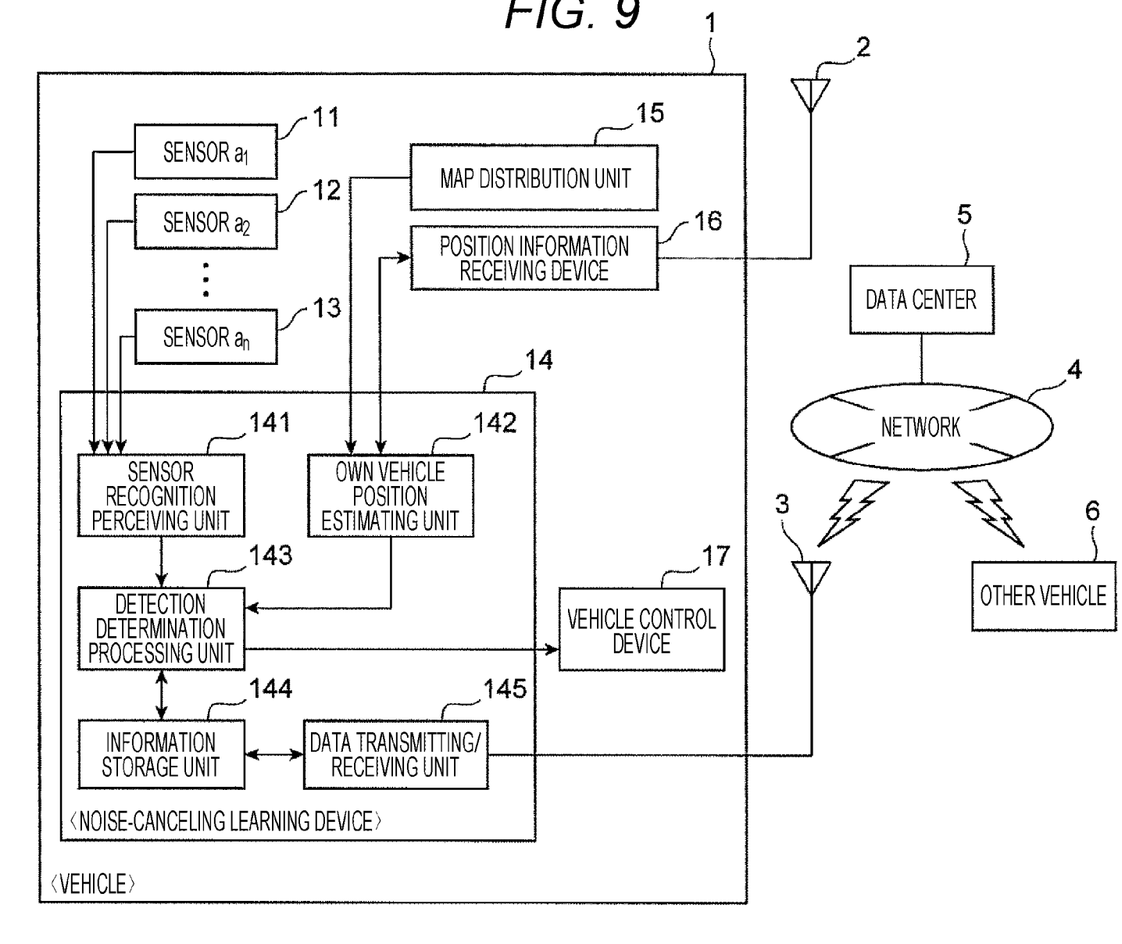
FIG. 9 is a schematic configuration diagram of a vehicle mounting a second embodiment of a noise-canceling learning device according to the present invention.

FIG. 9 is a schematic configuration diagram of a vehicle mounting a second embodiment of a noise-canceling learning device according to the present invention. In FIG. 9, the same components as those in FIG. 1 are denoted by the same reference numerals, and differences from FIG. 1 will be mainly described below.

In the present second embodiment, the reference numeral 145 is a data transmitting/receiving unit provided in the noise-canceling learning device 14, the reference numeral 3 is a data transmitting/receiving antenna provided in the vehicle 1, the reference numeral 4 is a network provided outside the vehicle 1, the reference numeral 5 is a data center laid outside the vehicle 1, and the reference numeral 6 is another vehicle.

In the present second embodiment, similarly to the first embodiment, the sensor $a_1$ 11, the sensor $a_2$ 12, and the sensor $a_n$ 13 recognize the surroundings of the vehicle (own vehicle) 1, and the recognition results are transmitted to the sensor recognition perceiving unit 141 of the noise-canceling learning device 14 at a predetermined period.

The sensor recognition perceiving unit 141 perceives an object (pedestrian, bicycle, motorcycle, vehicle, or the like) as a target object existing around the own vehicle 1 and the distance to the object from the results recognized by the respective sensors $a_1$ 11, $a_2$ 12, and $a_n$ 13.

On the other hand, the own vehicle position estimating unit 142 of the noise-canceling learning device 14 estimates an own vehicle position from the map information stored in the map distribution unit 15 and the position information on the vehicle 1 received at a predetermined period by the position information receiving device 16 through the GPS antenna 2.

The detection determination processing unit 143 of the noise-canceling learning device 14 reads the data table stored in the information storage unit 144 of the noise-canceling learning device 14, and determines whether information matching the own vehicle position information estimated by the own vehicle position estimating unit 142 is stored. If there is no matching information (data), the detection determination processing unit 143 generates vehicle control information to be used for traveling control of the own vehicle 1 based on the object information perceived by the sensor recognition perceiving unit 141, and outputs the vehicle control information to the vehicle control device 17. Thereafter, the detection determination processing unit 143 stores the own vehicle position information estimated by the own vehicle position estimating unit 142, and the object (perceived object), the distance to the object, and the like, perceived by the sensor recognition perceiving unit 141 in (a data table of) the information storage unit 144.

On the other hand, if there is matching information (data), the detection determination processing unit 143 compares the distance to the object, and the recognition pattern at that time, stored in the data table read from the information storage unit 144 with the distance to the object, and the recognition pattern of the object, perceived by the sensor recognition perceiving unit 141. If the comparison results do not match, based on the object information perceived by the sensor recognition perceiving unit 141, vehicle control information to be used for traveling control of the own vehicle 1 is generated and output to the vehicle control device 17. Thereafter, the detection determination processing unit 143 stores the own vehicle position information estimated by the own vehicle position estimating unit 142, and the object (perceived object), the distance to the object, and the like, perceived by the sensor recognition perceiving unit 141 in (a data table of) the information storage unit 144.

In addition, if the comparison results match, based on the determination object stored in the data table, vehicle control information to be used for traveling control of the own vehicle 1 is generated, and the vehicle control information is output to the vehicle control device 17. Thereafter, the detection determination processing unit 143 stores the own vehicle position information estimated by the own vehicle position estimating unit 142, and the object (perceived object), the distance to the object, and the like, perceived by the sensor recognition perceiving unit 141 in (a data table of) the information storage unit 144.

In addition to the above configuration, in the present second embodiment, the data transmitting/receiving unit 145 of the noise-canceling learning device 14 outputs/transmits the data table (the data table including the erroneous recognition information as described above), and the vehicle information on the vehicle 1, stored in the information storage unit 144 to the outside through a data transmitting/receiving antenna 3 at a predetermined period.

The data center 5 holds the data table and the vehicle information transmitted from the (data transmitting/receiving unit 145 of) vehicle 1 via the network 4, and transmits the data table to another vehicle 6 having the same type of sensor configuration or the like as that of the vehicle 1 based on the vehicle information transmitted from the vehicle 1 at a predetermined period. It should be noted that also from the other vehicle 6 having the same type of sensor configuration or the like as that of the vehicle 1, a data table including information related to the data table is output/transmitted to the data center 5. (The data transmitting/receiving unit 145 of) the vehicle 1 receives the data table from the data center 5 through the data transmitting/receiving antenna 3 at a predetermined period.

Based on these data tables received via the data center 5 and the network 4, the vehicle 1 or the other vehicle 6 cancels unnecessary perceived information based on the erroneous recognition information included in the data table even in places and areas where itself has never traveled, and it becomes possible to appropriately control the vehicle 1 or the other vehicle 6.

Thus, in the present second embodiment, the same type of vehicles having the same type of sensor configuration and the like share information with each other, whereby it is possible to increase the number of places where vehicles can travel properly at first sight.

It should be noted that in the present embodiment, a configuration in which the sensor configuration and the like transmit data to the other vehicle 6 of the same type as the vehicle 1 at a predetermined period has been described. The same effect can be obtained also by the methods of, based on position information, transmitting the data table to a vehicle that enters the area, transmitting the data table in response to a request from the other vehicle 6, and transmitting the data table and the vehicle information all at once and determining the availability by the receiving vehicle side.

In addition, in the present embodiment, as the other vehicle 6, a vehicle having the sensor configuration (configuration of the sensor $a_1$ 11, the sensor $a_2$ 12, the sensor $a_n$ 13) of the same type as the vehicle 1 is illustrated, but a vehicle having the same type of vehicle color, paint type, size, or category (SU vehicle, compact vehicle, or the like) as the vehicle 1 may be used, for example.

In addition, naturally, the number of other vehicles is not limited to one, and may be any number.

It should be noted that the present invention is not limited to the embodiments described above, and includes various modified embodiments. For example, the above-described embodiments are described in detail for easy understanding of the present invention, and are not necessarily limited to those including all the configurations described. In addition, a part of the configuration of one embodiment can be replaced with the configuration of another embodiment, and the configuration of another embodiment can be added to the configuration of one embodiment. In addition, it is possible to add, delete, and replace another configuration with respect to a part of the configuration of each of the embodiments.

In addition, each of the above-described configurations, functions, processing units, processing means, and the like may be partially or entirely achieved by hardware by, for example, designing with integrated circuits.

In addition, each of the above-described configurations, functions, and the like may be achieved by software by interpreting and executing a program that achieves each function by the processor. Information such as a program, a table, and a file for achieving each function can be placed in a storage device such as a memory, a hard disk, or a solid state drive (SSD), or a recording medium such as an IC card, an SD card, or a DVD.

In addition, the control lines and the information lines indicate those which are considered necessary for the description, and do not necessarily indicate all the control lines and the information lines on the product. Actually, it can be considered that almost all components are connected to each other.

REFERENCE SIGNS LIST 1 vehicle
2 GPS antenna
3 data transmitting/receiving antenna
4 network
5 data center
6 other vehicle
11 sensor $a_1$
12 sensor $a_2$
13 sensor $a_n$
14 noise-canceling learning device
15 map distribution unit
16 position information receiving device
17 vehicle control device
141 sensor recognition perceiving unit
142 own vehicle position estimating unit
143 detection determination processing unit
144 information storage unit
145 data transmitting/receiving unit

The invention claimed is:

1. A noise-canceling learning device comprising a processor configured to:
    estimate a position of an own vehicle;
    perceive a target object existing around the own vehicle as a perceived target object;
    determine whether the perceived target object perceived by sensor recognition perceiving unit is correct; and
    store the estimated position of the own vehicle,
    wherein the processor is further configured to
        store the perceived target object as a determination target object in association with positions of the perceived target object and the own vehicle,
        store tracking information obtained by tracking the perceived target object in association with the perceived target object and the determination target object,
        determine whether the perceived target object and the stored determination target object match based on the estimated position of the own vehicle,
        determine whether there is the tracking information in the stored perceived target object, and in response to determining the tracking information is present, compare a perceived target object in immediately preceding tracking information on the tracking information with the perceived target object, and in response to determining comparison results do not match, trace back the tracking information and update the stored determination target object with the perceived target object, and
        determine whether the perceived target object is correct.

2. The noise-canceling learning device according to claim 1,
    wherein if the estimated position of the own vehicle and the stored position of the own vehicle do not match, if the perceived target object and the stored perceived target object do not match, or if the perceived target object and the determination target object stored in association with positions of the perceived target object and the own vehicle match, based on the perceived target object, the processor is further configured to generate vehicle control information used for traveling control of the own vehicle, and causes the processor to store the perceived target object as the determination target object, and
    wherein if the estimated position of the own vehicle and the stored position of the own vehicle match, if the perceived target object and the stored perceived target object match, and if the perceived target object and the determination target object stored in association with positions of the perceived target object and the own vehicle do not match, based on the stored determination target object, the processor is further configured to generate vehicle control information used for traveling control of the own vehicle.

3. The noise-canceling learning device according to claim 1, wherein together with the perceived target object, the processor stores at least one of time and weather at which the target object is perceived as the perceived target object.

4. The noise-canceling learning device according to claim 1, wherein together with the perceived target object, the processor stores a recognition pattern of the target object, and a distance to the target object, for perceiving the target object as the perceived target object.

5. The noise-canceling learning device according to claim 1, wherein the processor is further configured to transmit a data table including stored information to a data center provided outside and to receive, from the data center, information related to the data table in another vehicle of a same type as the own vehicle.

6. A vehicle comprising:
    a noise-canceling learning device according to claim 1;
    one or more processors configured to
        distribute map information, and
        receive position information;
    a sensor mounted on the own vehicle, the sensor configured to recognize surroundings of the own vehicle; and
    a vehicle control device configured to control a traveling state of the own vehicle based on vehicle control information generated by the noise-canceling learning device.

7. A noise-canceling learning device comprising a processor configured to:

estimate a position of an own vehicle;
perceive a target object existing around the own vehicle as a perceived target object;
determine whether the perceived target object perceived by the sensor recognition perceiving unit is correct; and
store the estimated position of the own vehicle,
wherein the processor is further configured to
- store the perceived target object as a determination target object in association with positions of the perceived target object and the own vehicle,
- store tracking information obtained by tracking the perceived target object in association with the perceived target object and the determination target object,
- determine whether the perceived target object and the stored determination target object match based on the estimated position of the own vehicle,
- determine whether there is the tracking information in the stored perceived target object, and in response to determining the tracking information is present, compare a perceived target object in immediately preceding tracking information on the tracking information with the perceived target object, and in response to determining comparison results do not match, trace back the tracking information and update a preset erroneous detection flag, and
- determine whether the perceived target object is correct.

* * * * *